United States Patent [19]

Moore et al.

[11] Patent Number: 5,071,037
[45] Date of Patent: Dec. 10, 1991

[54] BLOW MOLDED BOTTLE WITH INTEGRAL POUR SPOUT

[75] Inventors: Eugene L. Moore, York, Pa.; Jean F. Rubie, Waterloo, Belgium

[73] Assignee: Graham Engineering Corporation, York, Pa.

[21] Appl. No.: 405,746

[22] Filed: Sep. 14, 1989

[51] Int. Cl.$^5$ .................................... B67D 5/00
[52] U.S. Cl. .................................... 222/109; 222/529; 222/530
[58] Field of Search ............ 222/108, 109, 571, 549, 222/529, 530; 215/31, 232; 220/257

[56] References Cited

U.S. PATENT DOCUMENTS

| | | | |
|---|---|---|---|
| 2,732,978 | 1/1956 | Oakland | 222/215 |
| 2,753,092 | 7/1956 | Smith | 222/108 |
| 2,758,755 | 8/1956 | Schafler | 222/213 |
| 2,895,654 | 7/1959 | Bieke | 222/530 |
| 3,198,393 | 8/1965 | Kitterman | 222/571 |
| 3,198,861 | 8/1965 | Marvel | 264/98 |
| 3,387,749 | 6/1968 | Godshalk et al. | 222/143 |
| 3,478,912 | 11/1969 | Seiler | 215/31 |
| 3,613,966 | 10/1971 | Summers | 222/529 |
| 3,690,522 | 9/1972 | Chlystun | 222/529 |
| 3,804,139 | 4/1974 | Kimm | 215/31 |
| 3,858,773 | 1/1975 | Del Bon | 222/529 |
| 4,128,189 | 12/1978 | Baxter | 222/109 |
| 4,236,629 | 12/1980 | Dwinell | 222/529 |
| 4,422,563 | 12/1983 | Babiol | 222/153 |
| 4,467,931 | 8/1984 | Gach | 220/257 |
| 4,550,862 | 11/1985 | Barker et al. | 222/109 |
| 4,568,006 | 2/1986 | Mueller et al. | 222/530 |
| 4,616,759 | 10/1986 | Mahler | 215/228 |
| 4,618,078 | 10/1986 | Hamman et al. | 222/529 |
| 4,632,282 | 12/1986 | Nagashima | 222/529 |
| 4,640,855 | 2/1987 | St. Clair | 428/36 |
| 4,671,421 | 6/1987 | Reiber et al. | 222/571 |
| 4,706,829 | 11/1987 | Li | 222/109 |
| 4,890,768 | 1/1990 | Robinson | 222/109 |

Primary Examiner—Michael S. Huppert
Assistant Examiner—Anthoula Pomrening
Attorney, Agent, or Firm—Thomas Hooker

[57] ABSTRACT

An integral molded container including a neck, an interior spout or pour neck joined to the neck by a stable circumferential inversion column.

10 Claims, 3 Drawing Sheets

BLOW MOLDED BOTTLE WITH INTEGRAL POUR SPOUT

FIELD OF THE INVENTION

This invention relates to molded plastic containers, typically bottles, having a neck and an inversion column port extending radially inwardly from the neck to a spout or cap. The bottle or container is manufactured from a preform in which the column is extended and the spout or closure is located above the neck. The preform is inverted within the neck to move the spout or closure closer to the container.

DESCRIPTION OF THE PRIOR ART

It is old to mold a plastic preform having a spout extending at an angle away from the neck with an integral inclined portion of plastic joining the spout to the neck. The inclined portion is heated, softened and then inverted using rotary tooling to lower the lower end of the spout into the neck. It is known to blow mold a bottle with a neck, central pouring spout and a shallow trough between the neck and spout.

It is also conventional to blow mold bottles with large diameter necks and then fit a separate injection molded part including a pour spout into the neck to provide a unitary body having a central pour spout and a drain back trough located between the spout and neck. This construction requires two parts manufactured by different processes and assembly of the parts and is very expensive.

SUMMARY OF THE INVENTION

The present invention concerns molded plastic containers, typically bottles, having a neck, an inversion column port integrally joined at one end to the neck and a spout or pouring mouth integrally joined to the other end of the inversion column. The bottle is molded with the column in an extended position projecting outwardly from the neck. The column is pushed in toward the bottle and turned inside out or inverted, thereby lowering the pouring spout or mouth into the neck to provide a compact construction and a drain back trough below the neck. The trough can be used to collect liquid drips or spills during pouring. This liquid flows back into the interior of the bottle through a drain opening at the bottom of the trough.

The bottle may be provided with an inversion column and inner mouth port which is easily moved between the inverted and extended positions thereby permitting collapse of the column into the neck for shipment or storage of the bottle and ready extension of the column outwardly of the bottle to facilitate opening of the bottle and pouring from the bottle. The collapsed inversion column and an inner neck and closure may be located in a cavity completely below the lip at the top of the outer neck to permit attaching a tamper evident barrier to the outer lip. The integrity of the barrier assures that the bottle has not been opened. Redundant tamper evident closures may be provided including a tamper evident cap mounted on the inner neck and an outer tamper evident cap mounted on the outer neck and overlying the tamper evident seal. The use of multiple tamper evident closures provides increased assurance to the public that the contents of the bottle have not been tampered with. For instance, multiple tamper evident closures may be used to seal bottles containing food, dry and liquid pharmaceuticals, blood, saline solution and the like.

The port includes a pair of like concave and convex sections located at the inner and outer ends of the inversion column. In the molded bottle preform, the inner section is concave and the outer section is convex and has an upper diameter less than the diameter at the bottom of the lower section. Inversion of the column is achieved by forcing the top of the column, supported if necessary, down into the neck to form a circumferential roll at the lower end of the concave portion and then moving the roll along the length of the column to invert the column so that the lower and upper portions are turned inside out and become, respectively, convex and concave. The inverted column has a neutral surface located between the inner and outer surfaces and is stable. Inversion does not require softening of the column plastic, although in some situations the column may be heated somewhat to facilitate inversion.

The outer end of the inversion column away from the bottle neck is joined to a central structure, typically a pour spout or threaded pouring mouth. These structures are formed during molding of the preform and are coaxial with the axis of the bottle. The preform may be blow molded from a relatively narrow diameter parison. There is no need to provide a large diameter parison as required in the manufacture of the preform for the prior art bottle with an inverted pour spout where the preform spout extends angularly away from the bottle neck.

The ability to blow mold the preform from a parison having a diameter less than the diameter of the inversion column means the column is continuous without seams formed during closing of the mold. Elimination of the seams in the inversion column increases the strength of the column and reduces the possibility that the column will fracture when stressed during inversion.

Other objects and features of the invention will become apparent as the description proceeds, especially when taken in conjunction with the accompanying drawings illustrating the invention, of which there are four sheets and four embodiments.

DESCRIPTION OF THE PREFERRED EMBODIMENTS

Figure 1:
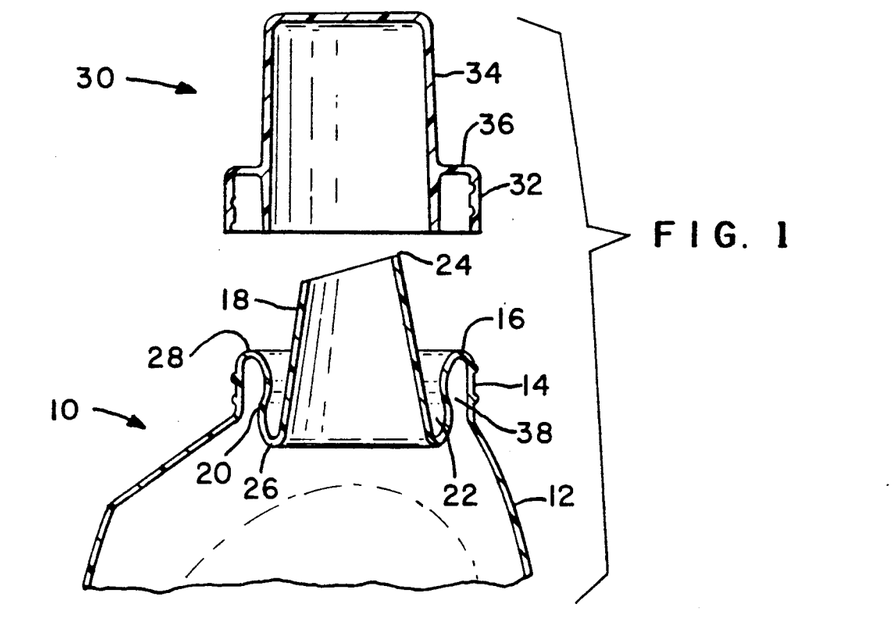
FIG. 1 is a sectional view showing the top of a bottle and a cap for closing the bottle according to the invention.

FIG. 1 illustrates a molded integral plastic bottle 10 having a body 12, a cylindrical threaded neck 14 defining an opening in the bottle, a seal lip 16 at the top of the neck and an integral generally tubular pour spout 18 located within the neck. The lower end of the pour spout is connected to the seal lip by circumferentially continuous inverted column port 20 integrally joined to the neck and spout and located within the neck. The inverted column and the lower portion of the spout define a circular drain trough 22 inside the neck.

The open top of the spout 18 is angled to define a pouring lip 24 on one side of the bottle. Drain back opening 26 is formed through in the bottom of the trough on the side of the bottle away from lip 24. A small vent and pouring opening 28 is provided in lip 16 above the opening 26.

Cap 30 closes bottle 10 and includes a cylindrical wall 32 having interior threads engagable with the exterior threads of neck 14, a cup 34 which fits over the spout 18 and a seal wall 36 extending between the wall 32 and cup 34. When the cap is threaded onto the bottle wall 36 engages neck 16 and seals the interior of the bottle to prevent leakage. With the cap in place any liquid flowing through the open spout 18 is confined, flows into the trough 22 and drains into the interior of the bottle through opening 26. Cap wall 36 closes the small opening 28. When the cap is removed from the bottle liquid may be poured freely from the spout, preferably over lip 24. Bottle 10 may include an integral handle to facilitate pouring, located on the side of the bottle away from the lip 24.

Any liquid remaining on the outside of the spout after pouring drains down into the trough 22 and back into the interior of the bottle through opening 26. During pouring of the final liquid from the bottle a small volume of liquid is confined within inner trough 38 located between neck 14 and column 20. This residue may be drained from the bottle by reversing the position of the bottle 180 degrees with the opening 28 down so the residual liquid in the inner trough flows out through the opening.

Figure 2:
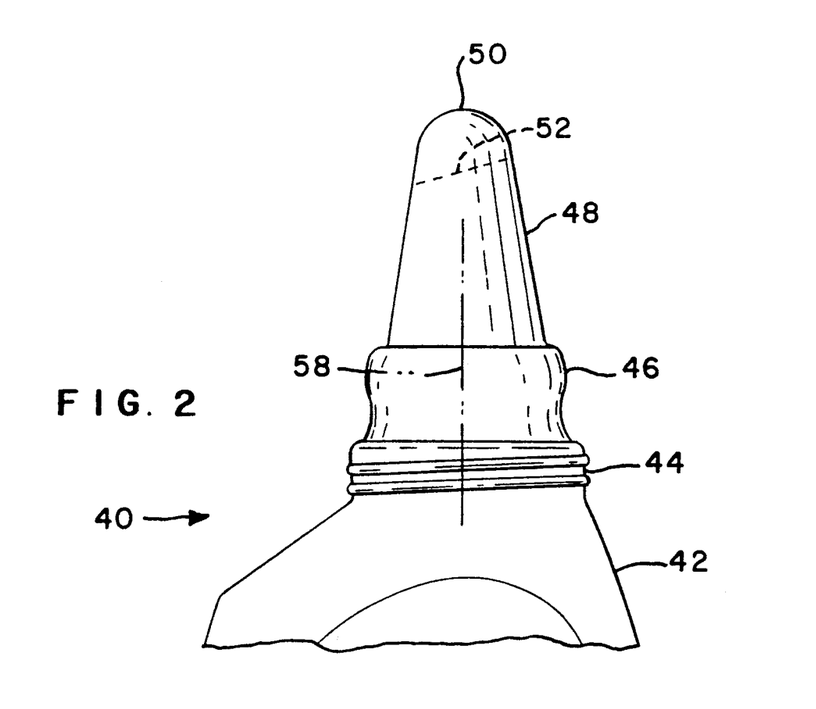
FIG. 2 is a side view of the preform used to make the bottle of FIG. 1 before inversion.

FIG. 2 illustrates a molded bottle preform 40 used in making bottle 10. The preform is preferably blow molded, although it may be formed by injection molding. Preform 40 includes body 42 identical to bottle body 12, a threaded neck 44 identical to neck 14, integral port inversion column 46 extending upwardly from the neck, and a pour spout 48 extending upwardly from column 46 with a closed tip 50. The tip is severed from the spout at cut line 52 to provide the angled pouring lip 24 of bottle 10. The preform is symmetrical around preform axis 58. Column 46 has a larger diameter at the bottom than at the top. This allows inversion of the column inside the neck.

The preform may be provided with the openings at the top and bottom respectively of column 46 corresponding to drainage openings 26 and 28 in bottle 10. One opening may be made during molding by extending a blow needle through the sidewall of the plastic forming the preform. One or both openings may be formed at the desired locations by suitable punching or drilling operations.

The drain and vent openings are useful when bottle 10 is filled with a liquid. In other applications one or both of the drain and vent openings may be omitted. For instance, there is no need to provide both openings in the bottle of FIG. 11 where the column is extended from the inverted position for pouring. A single drain opening like opening 26 may be provided.

Figures 6, 7, 8, 9, 10:
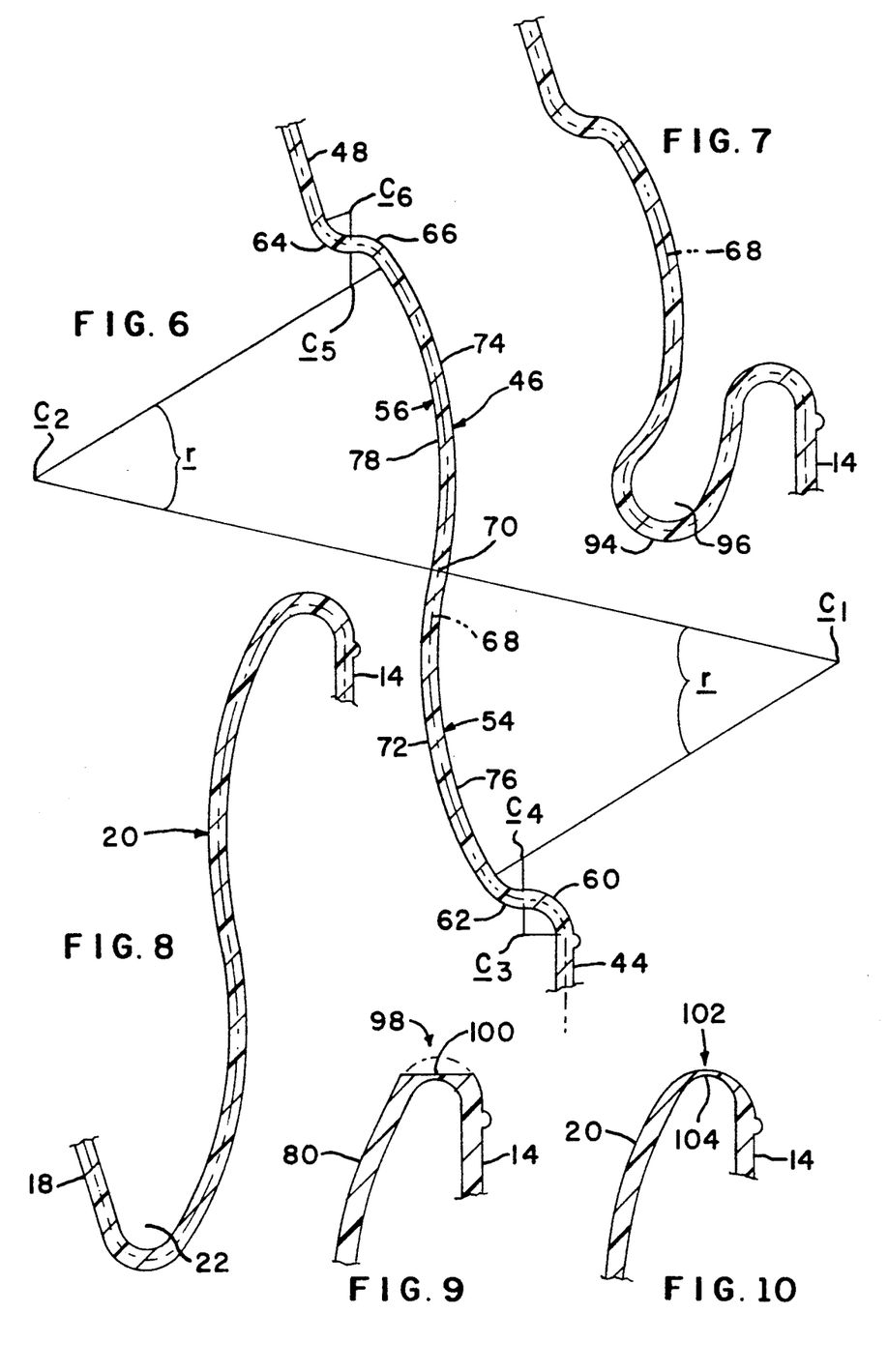
FIG. 6 is an enlarged sectional view showing the inversion column as molded and shown in FIG. 3.
FIGS. 7 and 8 illustrate inversion of the column of FIG. 6 and correspond generally to FIGS. 4 and 5.
FIGS. 9 and 10 are sectional views illustrating different embodiment sealing lips.

FIG. 6 is a radial sectional view taken through the vertical axis of the top of the bottle preform 40 showing the geometry of the inversion column 46, the top of neck 44 and the bottom of spout 48 as molded. Column 46 includes a pair of like semi-toroidal portions 54 and 56, each of which extends circumferentially around the vertical axis 58 of the preform neck 44, column 46 and spout 48 (see FIG. 2). As viewed from the outside of the bottle, portion 54 is concave and portion 56 is convex. The lower end of portion 54 is smoothly connected to the inwardly curved top 60 of neck 44 by concave short radius semi-toroidal portion 62. The upper end of portion 56 is connected to the outwardly curved lower end 64 of spout 48 by convex short radius semi-toroidal portion 66. As illustrated, the inversion column 46 has a uniform thickness along its length and is circumferentially continuous around axis 58. The like major sections 54 and 56 lie on tori having center axes on circles $C_1$ and $C_2$, each located the same radial distance r from the neutral surface 68 of the column. The neutral surface extends around the neck, the inversion column and the spout.

All of the convex and concave portions smoothly join each other. The two portions 54 and 56 subtend equal angles around their respective axis $C_1$ and $C_2$, and have equal arc lengths along neutral surface 68. These sections are joined smoothly at circular inflection circle 70 located midway along the height of column 46.

When viewed in radial section as in FIG. 6, the arc length of the inner, convex surface 72 of portion 54 equals the arc length of the outer convex surface 74 of portion 56 and the arc length of the outer concave surface 76 of section 54 equals the arc length of the inner concave surface 78 of section 56.

The preform 40 is preferably molded from hot thermoplastic resin so that the plastic stabilizes without stress and column 46 is free standing and stable in the shape illustrated in FIGS. 2 and 6. The plastic in the column to either side of the neutral surface 68 is not stressed by compressive or tensile forces.

Figure 3:
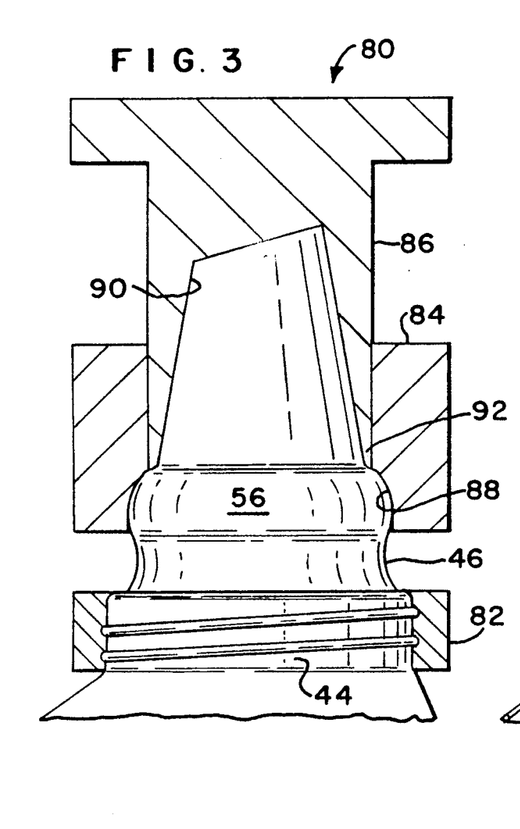
FIGS. 3, 4 and 5 are sectional views illustrating inversion of the preform.
Figures 4, 5, 11:
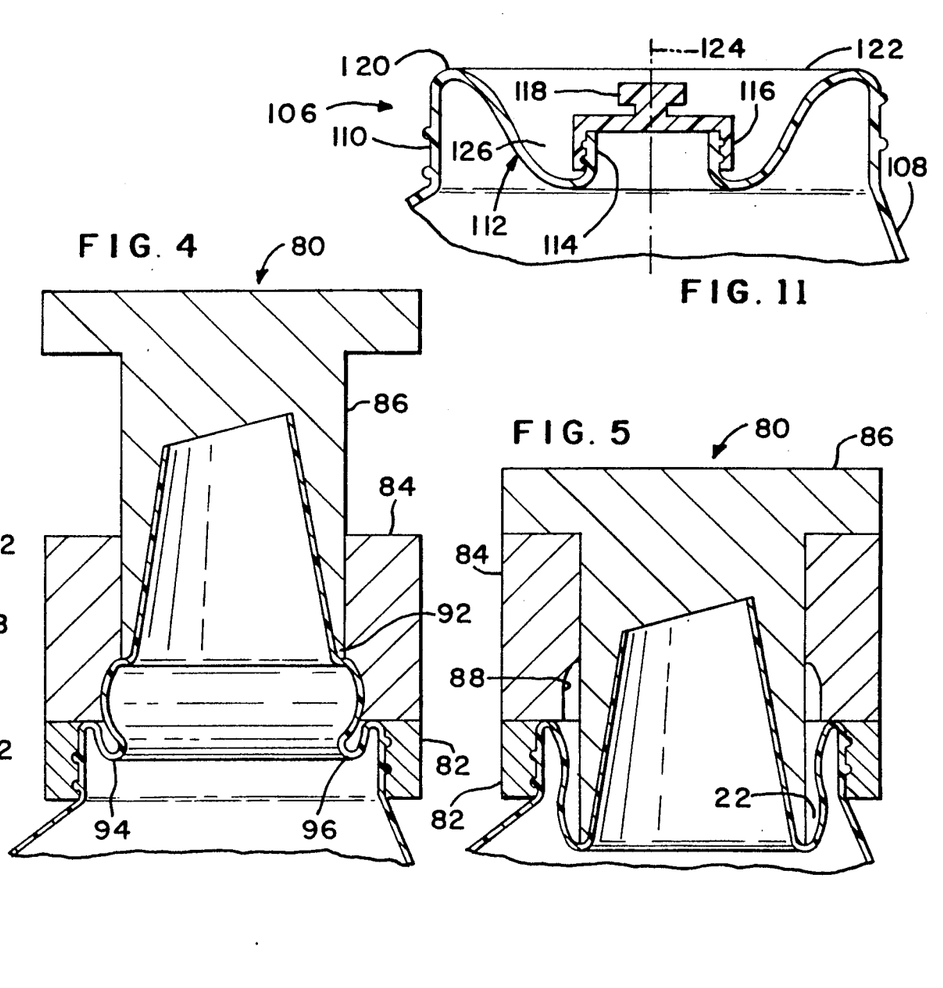
FIG. 11 is a sectional view illustrating a second bottle in the inverted position.

FIGS. 3, 4 and 5 illustrate tooling 80 used to invert column 46. The tooling includes a neck clamp 82, retaining ring 84 and driver 86. The neck clamp 82 includes a number of clamp parts each partially surrounding the neck. The clamp tightly holds preform neck 44 and engages the threads on the neck to support the neck against vertical movement during inversion of column 46.

Retaining ring 84 is slidably mounted on the lower portion of driver 86 and includes an interior circumferential surface 88 engaging and supporting exterior surface 74 of the upper column portion 56. Driver 86 includes an interior surface 90 engaging the exterior surface of spout 48 following removal of tip 50 and a circular lower driving end 92 resting on the upper outward curved portion 64 at the bottom of spout 48. During inversion of column 46 the tooling holds the spout and neck in alignment with axis 58 without deformation as the column 46 is inverted or turned inside out as illustrated.

The top of the bottle preform 40 is inverted by affixing neck clamp 82 on the bottle neck and locating the retaining ring 84 and driver 86 as shown in FIG. 3 with surface 88 resting on and supporting column portion 56. The driver and retaining ring are then lowered together to the position of FIG. 4 where the ring bottoms on neck clamp 82. During initial lowering of the spout and inversion column 46 the downward force exerted on the column is concentrated at the junction between the bottom of the column and the supported top of the neck 60. The driving force is sufficient to roll this portion downwardly thereby forming a circumferential 180 degree roll 94 at the top of lip 44. As the driver and ring are lowered the roll 94 moves along the height of the column 56 and inverts the column. In the position of FIG. 4 the roll 94 is located halfway along lower portion 54 and approximately one half of the lower portion has been inverted. During initial inversion rolling of portion 54 the retaining ring 84 supports the upper portion 56 and forces inversion rolling of the lower portion. Continued lowering of driver 86 moves the roll along column 56 to the spout to invert the remaining upper part of the lower portion 54 and the entirety of the upper portion 56 and complete inversion as shown in FIG. 5. During inversion the upper portion is rolled out of the retaining ring 84. Inversion moves the trough 96 inside roll 94 down the column to form bottle trough 22. In some bottles inversion of the column is facilitated by heating the column in the preform.

FIG. 7 is a radial sectional view illustrating the partially inverted column 94 of FIG. 4 and FIG. 8 is a radial sectional view showing the fully inverted column 96 of FIG. 5.

After inversion the like column portions 54 and 56 are moved inside out from convex to concave and concave to convex with the corresponding portions 5 and 56 of the inverted column having the same shape as before. The two small diameter portions 62 and 66 at the ends of the column are likewise inverted and shift, respectively, from concave to convex and convex to concave.

Initial formation of roll 94 subjects the plastic at the lower end of the column to stresses which propagate the roll throughout the column so that once the roll is formed the column of its own accord moves into the neck to the fully inverted, low energy position of FIG. 8, even in the absence of tooling 80. The disclosed tooling is used to form the initial roll and assure complete inversion despite variations in the preform expected in volume manufacture which could prevent automatic inversion.

When fully inverted the column is stable and assures port stability. The inverted like sections 54 and 56 include plastic on both sides of the neutral surface 96. The plastic on one side is subject to compressive forces and the plastic on the other side of the neutral surface is subjected to tensile forces so that the two forces balance each other at the neutral axis and the extruded column is stable. Inversion of column 46 compresses the plastic between the neutral surface and the prior convex surfaces and tensile stresses the plastic between the neutral surface and prior concave surfaces. The equal arc lengths of these surfaces in the two portions 54 and 56 provide the stability of the inverted column.

FIG. 9 illustrates a second embodiment lip seal for bottle 10. In this embodiment the bottle is molded to provide greater thickness of plastic at circular lip between neck 14 and column 20. This plastic may be as much as 130 percent greater in thickness than the thickness of the plastic in the neck or column. Following inversion of the column the thick lip is machined away to provide very accurately formed flat seat 100 extending around the neck. Seat 100 is accurately located with regard to the neck and provides improved sealing with cap 30 without the necessity of a specialized sealing element, such as a resilient gasket and the like.

FIG. 10 illustrates a third embodiment lip seal 102 in which the molded lip plastic 104 joining neck 14 and column 20 is relatively thin and flexible, having a thickness less than the thickness of the adjacent neck and column. This plastic flexes and acts as a spring when the cap is screwed onto the bottle thereby assuring an effective circumferential seal between the cap and bottle independent of dimensional variations in the neck 14, lip 102 or cap 30 which may occur during volume manufacture.

FIG. 11 illustrates another embodiment molded bottle 106 having body 108 and neck 110 like body 12 and neck 14 of bottle 10. Inverted column 112, similar to column 20, extends inwardly from the neck 110 to a central pour neck 114 which is provided with exterior threads. Cap 116 is threadably mounted on neck 114 and includes a handle 118. The cap and handle are located in cavity 26 below the level of bottle lip 120 joining the neck to the column. A tamper evident seal 122 is bonded to lip 120 and closes the cavity with cap and handle 116 and 118 located beneath the seal. The seal must be broken in order to grip and pull out the cap and extend the inverted column 112 to facilitate removing the cap and pouring the contents of the bottle.

Threads may be provided on the exterior surface of neck 110 and used for mounting an overcap on the bottle. The overcap provides additional protection and assurance against tampering. The overcap may not be needed in some embodiments in which case threads are not provided on the neck.

Bottle 106 is formed from a molded preform similar to preform 40. The preform for bottle 106 includes an inversion column having a pair of like concave and convex sections similar to sections 54 and 56 of column 46. Columns 112 and 20 are approximately equal in height while the diameter of interior neck 114 is considerably smaller than the diameter of the base of spout 48. Compare FIGS. 2 and 11. The difference in the diameters of the two necks 110 and 114 means that the column 112 slopes inwardly toward the bottle axis 124 at an angle of approximately 45 degrees while column 46 slopes inwardly toward axis 58 at a much smaller acute angle. The difference in diameters at the top and bottom of column 112 reduces the force required for moving the column back and forth between the molded, extended position and the collapsed inverted position of FIG. 10 and facilitates manual extension and collapse of the column by engaging cap handle 118.

Tamper evident seal 122 may be made of suitable sheet material, such as a transparent plastic sheet, a metal foil sheet or the like. The seal is bonded to lip 120 without interfering with fitting an over cap on neck 110 or formation of the seal between the cap and lip. If desired, either or both of the caps fitted on bottle 106 may be provided with independent tamper evident features. In this way, bottle 106 may have triple redundant tamper evident features to insure the integrity of the contents of the bottle.

The filled bottle 106 is shipped to the customer with column 112 inverted as shown in FIG. 11 and the cap in cavity 126 below lip 120. This is a very stable construction with the inner pour neck 114 and cap protected against injury within cavity 126. The location of the cap and inner lip within the cavity reduces the height of the bottle and correspondingly reduces shipping volume. The relatively wide and strong neck 110 provides a base for mounting bottles 108 on top of each other for additional space saving. The bottoms of the bottles may be provided with recesses fitting over necks 110 to secure stacked bottles together during shipping and retail display.

Bottle 108 is opened for use by removing the over cap fitted on neck 110, breaking the tamper evident seal 122, if any, gripping the handle 118 and pulling the cap away from the bottle. The column is easily returned to the molded extended position with the cap 116 and lip 114 located above lip 120 in a position for easy removal of the cap and pouring of the contents of the bottle. Bottle 108 may be filled with liquid or particulate contents, such as laundry detergent, salt and the like. After sufficient contents has been removed from the bottle the cap 116 may be reaffixed and the column 112 reinverted to retract the interior neck and cap within neck 110.

FIGS. 1 and 11 illustrate bottles having a spout and a threaded interior neck 114. Other types of central structures may be provided in place of necks or pour spouts. For instance, a molded closure may be provided on the small diameter end of the column with an integral twist off or break away to.

The bottles 10 and 106 are preferably blow molded from thermoplastic resin and have continuous imperforate bodies 12 and 108. The invention is not limited to blow molded plastic bottles but extends to inversion column ports for bottles, containers and the like. For instance, injection molding may be used to manufacture an open ended tubular container having an end structure like that illustrated. The container may be filled with a fluid product, toothpaste or any other suitable contents. A molded, screw type or friction cap may be used to close the interior of the container. A molded inversion column port may have a circumferential mounting member at the large diameter end of the column for securing the port to a wall of a container such as a salt carton, a spice jar and the like.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is;

1. An integral container molded from stiffly flexible thermoplastic resin; the container including a body, an opening in the body, an inner neck having an end located below the opening, a removable cap sealing the neck and including a tamper evident feature, a stable circumferential column joining the opening and the inner neck, the column including a circumferential convex portion joining the opening and a circumferential concave portion joining the lower end of the inner neck, the thermoplastic resin on the inside of the convex portion and the thermoplastic resin on the outside of the concave portion being compressed, and the thermoplastic resin on the outside of the convex portion and the thermoplastic resin on the inside of the concave portion being tensile stressed, and a tamper evident seal bonded to the circumferential edge of the opening and overlying the column and inner neck.

2. An integral molded plastic bottle including a body, a cylindrical neck extending outwardly from the body, a spout located within and extending outward from the neck, a stable circumferentially continuous invert column having a circular outer end joining the top of the neck and a circular inner end joining the spout below the neck, said column having a circumferential convex portion joining the top of the neck and a circumferential concave portion joining the convex portion and the spout, the plastic on the inside of the convex portion and on the outside of the concave portion being compressed, and the plastic on the outside of the concave portion and on the inside of the concave portion being tensile stressed, the lengths of said portions as measured in a radial plane being approximately equal and said portions being smoothly curved, a drain opening at the bottom of the spout and a vent and drain opening at the top of the neck above the drain opening.

3. An integral container molded from stiffly flexible thermoplastic resin; the container including a body, an opening in the body, an inner neck having an end located beneath the opening, a removable cap sealing the neck, and a stable circumferential column joining the opening and the inner neck, the column including a circumferential convex portion joining the opening and a circumferential concave portion joining the lower end o the inner neck, the thermoplastic resins on the inside of the convex portion and the thermoplastic resin on the outside of the concave portion being compressed, and the thermoplastic resin on the outside of the concave portion and the thermoplastic on the inside of the concave portion being tensile stressed, a tamper evident seal bonded to the circumferential edge of the opening and overlying the column and inner neck, an exterior neck surrounding the opening, and an exterior cap engaging said exterior neck and extending over the tamper evident seal.

4. An integral container molded from stiffly flexible thermoplastic resin; the container including a body, a neck defining an opening in the body, a central feature having an end located below the opening, and a stable circumferential column joining the opening and the end of the central feature, the column including a circumferential convex portion joining the opening and a circumferential concave portion joining the lower end of the central feature, the thermoplastic resin on the inside of the convex portion and the thermoplastic resin on the outside of the concave portion being compressed, and the thermoplastic resin on the outside of the convex portion and the thermoplastic resin on the inside of the concave portion being tensile stressed, a thread on the exterior of the neck for engaging a cap closing the container and a sealing lip extending around the neck at the juncture between the neck and the column, said lip including a flat circumferential machine surface facing outwardly of the body.

5. An integral container molded from stiffly flexible thermoplastic resin; the container including a body, a neck defining an opening in the body, a central feature having an end located below the opening, and a stable circumferential column joining the opening and the end of the central feature, the column including a circumferential convex portion joining the opening and a circumferential concave portion joining the lower end of the central feature, the thermoplastic resin on the inside of the convex portion and the thermoplastic resin on the outside of the concave portion being compressed, and the thermoplastic resin on the outside of the convex portion and the thermoplastic resin on the inside of the concave portion being tensile stressed, a thread on the exterior of the neck for engaging a cap closing the container and a sealing lip extending around the neck at the junction between and neck and the column, said lip having a thickness less than the adjacent thickness of the neck or the column to define a resilient seal co-operable with a complimentary cap surface for forming a seal closing the body.

6. An integral molded plastic bottle including a body, a cylindrical neck extending outwardly from the body, a contents discharge feature located within the neck and a stable circumferentially continuous invert column having a circular outer end joined to the top of the neck and a circular inner end joining the discharge feature below the neck, said column having a circumferential convex portion joining the top of the neck and a circumferential concave portion joining the convex portion and the discharge feature, the plastic on the inside of the convex portion and on the outside of the concave portion being compressed, and the plastic on the outside of the convex portion and on the inside of the concave portion being tensile stressed, the lengths of said portions as measured in a radial plane being approximately equal and the portions being smoothly curved, and a sealing lip on the top of the neck having a reduced thickness flexible seal.

7. An integral molded plastic bottle including a body, a cylindrical neck extending outwardly from the body, a contents discharge feature located within the neck and a stable circumferentially continuous invert column having a circular outer end joined to the top of the neck and a circular inner end joining the discharge feature below the neck, said column having a circumferential convex portion joining the top of the neck and a circumferential concave portion joining the convex portion and the discharge feature, the plastic on the inside of the convex portion and on the outside of the concave portion being compressed, and the plastic on the outside of the convex portion and on the inside of the concave portion being tensile stressed, the lengths of said portions as measured in a radial plane being approximately equal and the portions being smoothly curved, and a sealing lip on the top of the neck having a flat machine seal surface.

8. An integral blow molded plastic bottle including a body, a cylindrical neck extending outwardly from the body, the spout located within the neck and a stable circumferentially continuous invert column having a circular outer end joined to the top of the neck and a circular inner end joined to the inner end of the spout below the neck, said column having a circumferential convex portion joining the top of the neck and a circumferential concave portion joining the convex portion and inner end of the spout, a drain opening at the bottom of the spout and a vent and drain opening at the top of the neck above the drain opening.

9. An integral blow molded plastic bottle including a body, a cylindrical neck extending outwardly from the body, the spout located within the neck and a stable circumferentially continuous invert column having a circular outer end joined to the top of the neck and a circular inner end joined to the inner end of the spout below the neck, said column having a circumferential convex portion joining the top of the neck and a circumferential concave portion joining the convex portion and inner end of the spout, and a sealing lip on the top of the neck having a reduced thickness flexible seal.

10. An integral blow molded plastic bottle including a body, a cylindrical neck extending outwardly from the body, the spout located within the neck and a stable circumferentially continuous invert column having a circular outer end joined to the top of the neck and a circular inner end joined to the inner end of the spout below the neck, said column having a circumferential convex portion joining the top of the neck and a circumferential concave portion joining the convex portion and inner end of the spout, and a sealing lip at the top of the neck having a flat machine seal surface.

* * * * *

UNITED STATES PATENT AND TRADEMARK OFFICE
CERTIFICATE OF CORRECTION

PATENT NO. : 5,071,037
DATED : December 10, 1991
INVENTOR(S) : Eugene L. Moore et al It is certified that error appears in the above—identified patent and that said Letters Patent is hereby corrected as shown below:

In the Drawings:

In Figure 1, add a line through the thickness of the lip 16 to the immediate right of the end of the lead line extending from reference number "28" to the lip; and add lines extending through the thickness of the bottom of the trough to either side of the end of the lead line extending from reference number "26" to the trough.

Column 4, lines 13 and 20 "$C_1$" should read --$\underline{C}_1$--; lines 14 and 20 "$C_2$" should read --$\underline{C}_2$--; and line 14, "r" should read --$\underline{r}$--.

Column 5, line 23 "5" should read --54--.

Column 8, line 13 "o" should read --of--; and line 41, "machine" should read --machined--.

Column 9, line 30 "machine" should read --machined--.

UNITED STATES PATENT AND TRADEMARK OFFICE
CERTIFICATE OF CORRECTION

PATENT NO. : 5,071,037

DATED : December 10, 1991

INVENTOR(S) : Eugene L. Moore et al

It is certified that error appears in the above-identified patent and that said Letters Patent is hereby corrected as shown below:

Column 10, line 32 "machine" should read --machined--.

Signed and Sealed this

Thirteenth Day of April, 1993

*Attest:*

STEPHEN G. KUNIN

*Attesting Officer* — *Acting Commissioner of Patents and Trademarks*